(12) United States Patent
Peterson

(10) Patent No.: US 8,890,955 B2
(45) Date of Patent: Nov. 18, 2014

(54) ADAPTABLE WIRELESS VEHICLE VISION SYSTEM BASED ON WIRELESS COMMUNICATION ERROR

(75) Inventor: Kenneth C. Peterson, Ada, MI (US)

(73) Assignee: Magna Mirrors of America, Inc., Holland, MI (US)

( * ) Notice: Subject to any disclaimer, the term of this patent is extended or adjusted under 35 U.S.C. 154(b) by 343 days.

(21) Appl. No.: 13/023,750

(22) Filed: Feb. 9, 2011

(65) Prior Publication Data

US 2011/0193961 A1    Aug. 11, 2011

Related U.S. Application Data

(60) Provisional application No. 61/303,054, filed on Feb. 10, 2010.

(51) Int. Cl.
| H04N 7/18 | (2006.01) |
| B60R 1/00 | (2006.01) |
| B60R 1/12 | (2006.01) |

(52) U.S. Cl.
CPC .......... *H04N 7/183* (2013.01); *B60R 2300/406* (2013.01); *B60R 1/00* (2013.01); *B60R 2001/1215* (2013.01)
USPC ....................................................... 348/148

(58) Field of Classification Search
CPC ................ B60R 2300/406; B60R 1/00; B60R 2001/1215; H04N 7/183
USPC ......................................................... 348/148
See application file for complete search history.

(56) References Cited

U.S. PATENT DOCUMENTS

| 2,632,040 A | 3/1953 | Rabinow |
| 2,827,594 A | 3/1958 | Rabinow |

(Continued)

FOREIGN PATENT DOCUMENTS

| EP | 0426503 | 5/1991 |
| EP | 0492591 | 7/1992 |

(Continued)

OTHER PUBLICATIONS

DR Irvin, "Variable-Rate Time-Domain Harmonic Scaling Speech Communication System," Mar. 1984, IBM Technical Disclosure Bulletin, p. 1-4.*

(Continued)

*Primary Examiner* — Richard Torrente
*Assistant Examiner* — Joseph Suh
(74) *Attorney, Agent, or Firm* — Gardner, Linn, Burkhart & Flory, LLP

(57) ABSTRACT

A vision system for a vehicle includes a camera subsystem and a display subsystem. The camera subsystem includes an imaging sensor disposed at an equipped vehicle that captures image data, and the camera subsystem wirelessly transmits the image data. The display subsystem includes a video display screen disposed in the equipped vehicle for displaying images for viewing by a driver of the equipped vehicle when the driver is normally operating the equipped vehicle. The display subsystem is operable to receive the transmitted image data from the camera subsystem. The display subsystem transmits an error signal responsive to processing of the image data and the camera subsystem receives the error signal and at least one of (a) adjusts a compression factor of the image data responsive to the error signal and (b) adjusts a transmission rate of the image data responsive to the error signal.

15 Claims, 3 Drawing Sheets

(56) References Cited

U.S. PATENT DOCUMENTS

| | | |
|---|---|---|
| 3,349,394 A | 10/1967 | Carver |
| 3,601,614 A | 8/1971 | Platzer |
| 3,612,666 A | 10/1971 | Rabinow |
| 3,665,224 A | 5/1972 | Kelsey |
| 3,680,951 A | 8/1972 | Jordan et al. |
| 3,689,695 A | 9/1972 | Rosenfield et al. |
| 3,708,231 A | 1/1973 | Walters |
| 3,746,430 A | 7/1973 | Brean |
| 3,807,832 A | 4/1974 | Castellion |
| 3,811,046 A | 5/1974 | Levick |
| 3,813,540 A | 5/1974 | Albrecht |
| 3,862,798 A | 1/1975 | Hopkins |
| 3,947,095 A | 3/1976 | Moultrie |
| 3,962,600 A | 6/1976 | Pittman |
| 3,985,424 A | 10/1976 | Steinacher |
| 3,986,022 A | 10/1976 | Hyatt |
| 4,037,134 A | 7/1977 | Löper |
| 4,052,712 A | 10/1977 | Ohama et al. |
| 4,093,364 A | 6/1978 | Miller |
| 4,111,720 A | 9/1978 | Michel et al. |
| 4,161,653 A | 7/1979 | Bedini |
| 4,200,361 A | 4/1980 | Malvano |
| 4,214,266 A | 7/1980 | Myers |
| 4,218,698 A | 8/1980 | Bart et al. |
| 4,236,099 A | 11/1980 | Rosenblum |
| 4,247,870 A | 1/1981 | Gabel et al. |
| 4,249,160 A | 2/1981 | Chilvers |
| 4,266,856 A | 5/1981 | Wainwright |
| 4,277,804 A | 7/1981 | Robison |
| 4,281,898 A | 8/1981 | Ochiai |
| 4,288,814 A | 9/1981 | Talley et al. |
| 4,355,271 A | 10/1982 | Noack |
| 4,357,558 A | 11/1982 | Massoni et al. |
| 4,381,888 A | 5/1983 | Momiyama |
| 4,420,238 A | 12/1983 | Felix |
| 4,431,896 A | 2/1984 | Lodetti |
| 4,443,057 A | 4/1984 | Bauer |
| 4,460,831 A | 7/1984 | Oettinger et al. |
| 4,481,450 A | 11/1984 | Watanabe et al. |
| 4,491,390 A | 1/1985 | Tong-Shen |
| 4,512,637 A | 4/1985 | Ballmer |
| 4,529,275 A | 7/1985 | Ballmer |
| 4,529,873 A | 7/1985 | Ballmer |
| 4,546,551 A | 10/1985 | Franks |
| 4,549,208 A | 10/1985 | Kamejima et al. |
| 4,571,082 A | 2/1986 | Downs |
| 4,572,619 A | 2/1986 | Reininger |
| 4,580,875 A | 4/1986 | Bechtel |
| 4,600,913 A | 7/1986 | Caine |
| 4,603,946 A | 8/1986 | Kato |
| 4,614,415 A | 9/1986 | Hyatt |
| 4,620,141 A | 10/1986 | McCumber et al. |
| 4,623,222 A | 11/1986 | Itoh |
| 4,626,850 A | 12/1986 | Chey |
| 4,629,941 A | 12/1986 | Ellis |
| 4,630,109 A | 12/1986 | Barton |
| 4,632,509 A | 12/1986 | Ohmi |
| 4,638,287 A | 1/1987 | Umebayashi et al. |
| 4,647,161 A | 3/1987 | Müller |
| 4,669,825 A | 6/1987 | Itoh |
| 4,669,826 A | 6/1987 | Itoh |
| 4,671,615 A | 6/1987 | Fukada |
| 4,672,457 A | 6/1987 | Hyatt |
| 4,676,601 A | 6/1987 | Itoh |
| 4,690,508 A | 9/1987 | Jacob |
| 4,692,798 A | 9/1987 | Seko et al. |
| 4,697,883 A | 10/1987 | Suzuki |
| 4,701,022 A | 10/1987 | Jacob |
| 4,712,879 A | 12/1987 | Lynam et al. |
| 4,713,685 A | 12/1987 | Nishimura et al. |
| 4,727,290 A | 2/1988 | Smith |
| 4,731,669 A | 3/1988 | Hayashi et al. |
| 4,741,603 A | 5/1988 | Miyagi |
| 4,768,135 A | 8/1988 | Kretschmer et al. |
| 4,789,904 A | 12/1988 | Peterson |
| 4,793,690 A | 12/1988 | Gahan |
| 4,817,948 A | 4/1989 | Simonelli |
| 4,820,933 A | 4/1989 | Hong |
| 4,825,232 A | 4/1989 | Howdle |
| 4,838,650 A | 6/1989 | Stewart |
| 4,847,772 A | 7/1989 | Michalopoulos et al. |
| 4,862,037 A | 8/1989 | Farber et al. |
| 4,867,561 A | 9/1989 | Fujii et al. |
| 4,871,917 A | 10/1989 | O'Farrell et al. |
| 4,872,051 A | 10/1989 | Dye |
| 4,881,019 A | 11/1989 | Shiraishi et al. |
| 4,882,565 A | 11/1989 | Gallmeyer |
| 4,886,960 A | 12/1989 | Molyneux |
| 4,891,559 A | 1/1990 | Matsumoto et al. |
| 4,892,345 A | 1/1990 | Rachael, III |
| 4,895,790 A | 1/1990 | Swanson et al. |
| 4,896,030 A | 1/1990 | Miyaji |
| 4,907,870 A | 3/1990 | Brucker |
| 4,910,591 A | 3/1990 | Petrossian et al. |
| 4,916,374 A | 4/1990 | Schierbeek |
| 4,917,477 A | 4/1990 | Bechtel et al. |
| 4,937,796 A | 6/1990 | Tendler |
| 4,953,305 A | 9/1990 | Van Lente et al. |
| 4,956,591 A | 9/1990 | Schierbeek |
| 4,961,625 A | 10/1990 | Wood et al. |
| 4,967,319 A | 10/1990 | Seko |
| 4,970,653 A | 11/1990 | Kenue |
| 4,971,430 A | 11/1990 | Lynas |
| 4,974,078 A | 11/1990 | Tsai |
| 4,987,357 A | 1/1991 | Masaki |
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,140,455 A | 8/1992 | Varaprasad et al. |
| 5,142,407 A | 8/1992 | Varaprasad et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |

(56) References Cited

U.S. PATENT DOCUMENTS

| | | |
|---|---|---|
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,461,357 A | 10/1995 | Yoshioka et al. |
| 5,461,361 A | 10/1995 | Moore |
| 5,469,298 A | 11/1995 | Suman et al. |
| 5,471,515 A | 11/1995 | Fossum et al. |
| 5,475,494 A | 12/1995 | Nishida et al. |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,525,264 A | 6/1996 | Cronin et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,567,360 A | 10/1996 | Varaprasad et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,634,709 A | 6/1997 | Iwama |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,668,663 A | 9/1997 | Varaprasad et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,187 A | 3/1998 | Varaprasad et al. |
| 5,724,316 A | 3/1998 | Brunts |
| 5,737,226 A | 4/1998 | Olson et al. |
| 5,760,826 A | 6/1998 | Nayar |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,798,575 A | 8/1998 | O'Farrell et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,867,591 A | 2/1999 | Onda |
| 5,877,707 A | 3/1999 | Kowalick |
| 5,877,897 A | 3/1999 | Schofield et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,910,854 A | 6/1999 | Varaprasad et al. |
| 5,914,815 A | 6/1999 | Bos |
| 5,923,027 A | 7/1999 | Stam et al. |
| 5,929,786 A | 7/1999 | Schofield et al. |
| 5,940,120 A | 8/1999 | Frankhouse et al. |
| 5,949,331 A | 9/1999 | Schofield et al. |
| 5,956,181 A | 9/1999 | Lin |
| 5,959,367 A | 9/1999 | O'Farrell et al. |
| 5,959,555 A | 9/1999 | Furuta |
| 5,963,247 A | 10/1999 | Banitt |
| 5,971,552 A | 10/1999 | O'Farrell et al. |
| 5,986,796 A | 11/1999 | Miles |
| 5,990,469 A | 11/1999 | Bechtel et al. |
| 5,990,649 A | 11/1999 | Nagao et al. |
| 6,001,486 A | 12/1999 | Varaprasad et al. |
| 6,002,511 A | 12/1999 | Varaprasad et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,087,953 A | 7/2000 | DeLine et al. |
| 6,097,023 A | 8/2000 | Schofield et al. |
| 6,097,024 A | 8/2000 | Stam et al. |
| 6,116,743 A | 9/2000 | Hoek |
| 6,124,647 A | 9/2000 | Marcus et al. |
| 6,124,886 A | 9/2000 | DeLine et al. |
| 6,139,172 A | 10/2000 | Bos et al. |
| 6,144,022 A | 11/2000 | Tenenbaum et al. |
| 6,154,306 A | 11/2000 | Varaprasad et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,178,034 B1 | 1/2001 | Allemand et al. |
| 6,198,409 B1 | 3/2001 | Schofield et al. |
| 6,201,642 B1 | 3/2001 | Bos |
| 6,222,447 B1 | 4/2001 | Schofield et al. |
| 6,222,460 B1 | 4/2001 | DeLine et al. |
| 6,243,003 B1 | 6/2001 | DeLine et al. |
| 6,250,148 B1 | 6/2001 | Lynam |
| 6,259,412 B1 | 7/2001 | Duroux |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,291,906 B1 | 9/2001 | Marcus et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,333,759 B1 | 12/2001 | Mazzilli |
| 6,341,523 B2 | 1/2002 | Lynam |
| 6,353,392 B1 | 3/2002 | Schofield et al. |
| 6,366,213 B2 | 4/2002 | DeLine et al. |
| 6,370,329 B1 | 4/2002 | Teuchert |
| 6,396,397 B1 | 5/2002 | Bos et al. |

(56) References Cited

U.S. PATENT DOCUMENTS

| | | | |
|---|---|---|---|
| 6,408,095 B1 * | 6/2002 | Maeda et al. | 382/232 |
| 6,411,204 B1 | 6/2002 | Bloomfield et al. | |
| 6,420,975 B1 | 7/2002 | DeLine et al. | |
| 6,424,273 B1 | 7/2002 | Gutta et al. | |
| 6,428,172 B1 | 8/2002 | Hutzel et al. | |
| 6,433,676 B2 | 8/2002 | DeLine et al. | |
| 6,442,465 B2 | 8/2002 | Breed et al. | |
| 6,477,464 B2 | 11/2002 | McCarthy et al. | |
| 6,485,155 B1 | 11/2002 | Duroux et al. | |
| 6,498,620 B2 | 12/2002 | Schofield et al. | |
| 6,513,252 B1 | 2/2003 | Schierbeek et al. | |
| 6,516,664 B2 | 2/2003 | Lynam | |
| 6,523,964 B2 | 2/2003 | Schofield et al. | |
| 6,534,884 B2 | 3/2003 | Marcus et al. | |
| 6,539,306 B2 | 3/2003 | Turnbull | |
| 6,547,133 B1 | 4/2003 | DeVries, Jr. et al. | |
| 6,553,130 B1 | 4/2003 | Lemelson et al. | |
| 6,559,435 B2 | 5/2003 | Schofield et al. | |
| 6,574,033 B1 | 6/2003 | Chui et al. | |
| 6,589,625 B1 | 7/2003 | Kothari et al. | |
| 6,593,565 B2 | 7/2003 | Heslin et al. | |
| 6,594,583 B2 | 7/2003 | Ogura et al. | |
| 6,611,202 B2 | 8/2003 | Schofield et al. | |
| 6,611,610 B1 | 8/2003 | Stam et al. | |
| 6,627,918 B2 | 9/2003 | Getz et al. | |
| 6,636,258 B2 | 10/2003 | Strumolo | |
| 6,648,477 B2 | 11/2003 | Hutzel et al. | |
| 6,650,233 B2 | 11/2003 | DeLine et al. | |
| 6,650,455 B2 | 11/2003 | Miles | |
| 6,672,731 B2 | 1/2004 | Schnell et al. | |
| 6,674,562 B1 | 1/2004 | Miles | |
| 6,680,792 B2 | 1/2004 | Miles | |
| 6,690,268 B2 | 2/2004 | Schofield et al. | |
| 6,700,605 B1 | 3/2004 | Toyoda et al. | |
| 6,704,621 B1 | 3/2004 | Stein et al. | |
| 6,710,908 B2 | 3/2004 | Miles et al. | |
| 6,711,474 B1 | 3/2004 | Treyz et al. | |
| 6,714,331 B2 | 3/2004 | Lewis et al. | |
| 6,717,610 B1 | 4/2004 | Bos et al. | |
| 6,735,506 B2 | 5/2004 | Breed et al. | |
| 6,741,377 B2 | 5/2004 | Miles | |
| 6,744,353 B2 | 6/2004 | Sjönell | |
| 6,757,109 B2 | 6/2004 | Bos | |
| 6,762,867 B2 | 7/2004 | Lippert et al. | |
| 6,794,119 B2 | 9/2004 | Miles | |
| 6,795,221 B1 | 9/2004 | Urey | |
| 6,802,617 B2 | 10/2004 | Schofield et al. | |
| 6,822,563 B2 | 11/2004 | Bos et al. | |
| 6,823,241 B2 | 11/2004 | Shirato et al. | |
| 6,824,281 B2 | 11/2004 | Schofield et al. | |
| 6,831,261 B2 | 12/2004 | Schofield et al. | |
| 6,847,487 B2 | 1/2005 | Burgner | |
| 6,882,287 B2 | 4/2005 | Schofield | |
| 6,889,161 B2 | 5/2005 | Winner et al. | |
| 6,891,563 B2 | 5/2005 | Schofield et al. | |
| 6,902,284 B2 | 6/2005 | Hutzel et al. | |
| 6,909,753 B2 | 6/2005 | Meehan et al. | |
| 6,946,978 B2 | 9/2005 | Schofield | |
| 6,953,253 B2 | 10/2005 | Schofield et al. | |
| 6,968,736 B2 | 11/2005 | Lynam | |
| 7,004,593 B2 | 2/2006 | Weller et al. | |
| 7,005,974 B2 | 2/2006 | McMahon et al. | |
| 7,038,577 B2 | 5/2006 | Pawlicki et al. | |
| 7,085,637 B2 | 8/2006 | Breed et al. | |
| 7,092,548 B2 | 8/2006 | Laumeyer et al. | |
| 7,111,968 B2 | 9/2006 | Bauer et al. | |
| 7,116,246 B2 | 10/2006 | Winter et al. | |
| 7,184,190 B2 | 2/2007 | McCabe et al. | |
| 7,195,381 B2 | 3/2007 | Lynam et al. | |
| 7,202,776 B2 | 4/2007 | Breed | |
| 7,227,459 B2 | 6/2007 | Bos et al. | |
| 7,255,451 B2 | 8/2007 | McCabe et al. | |
| 7,265,656 B2 | 9/2007 | McMahon et al. | |
| 7,274,501 B2 | 9/2007 | McCabe et al. | |
| 7,289,037 B2 | 10/2007 | Uken et al. | |
| 7,311,406 B2 | 12/2007 | Schofield et al. | |
| 7,325,934 B2 | 2/2008 | Schofield et al. | |
| 7,325,935 B2 | 2/2008 | Schofield et al. | |
| 7,338,177 B2 | 3/2008 | Lynam | |
| 7,339,149 B1 | 3/2008 | Schofield et al. | |
| 7,344,261 B2 | 3/2008 | Schofield et al. | |
| 7,370,983 B2 | 5/2008 | DeWind et al. | |
| 7,380,948 B2 | 6/2008 | Schofield et al. | |
| 7,388,182 B2 | 6/2008 | Schofield et al. | |
| 7,402,786 B2 | 7/2008 | Schofield et al. | |
| 7,423,248 B2 | 9/2008 | Schofield et al. | |
| 7,425,076 B2 | 9/2008 | Schofield et al. | |
| 7,459,664 B2 | 12/2008 | Schofield et al. | |
| 7,490,007 B2 | 2/2009 | Taylor et al. | |
| 7,526,103 B2 | 4/2009 | Schofield et al. | |
| 7,540,620 B2 | 6/2009 | Weller et al. | |
| 7,561,181 B2 | 7/2009 | Schofield et al. | |
| 7,616,781 B2 | 11/2009 | Schofield et al. | |
| 7,619,508 B2 | 11/2009 | Lynam et al. | |
| 7,626,749 B2 | 12/2009 | Baur et al. | |
| 7,646,410 B2 * | 1/2010 | Lim | 348/241 |
| 7,720,580 B2 | 5/2010 | Higgins-Luthman | |
| 7,855,755 B2 | 12/2010 | Weller et al. | |
| 7,881,496 B2 | 2/2011 | Camilleri et al. | |
| 7,965,336 B2 | 6/2011 | Bingle et al. | |
| 8,044,776 B2 * | 10/2011 | Schofield et al. | 340/425.5 |
| 2002/0015153 A1 | 2/2002 | Downs | |
| 2002/0044065 A1 | 4/2002 | Quist et al. | |
| 2002/0113873 A1 | 8/2002 | Williams | |
| 2002/0159270 A1 | 10/2002 | Lynam et al. | |
| 2003/0007261 A1 | 1/2003 | Hutzel et al. | |
| 2003/0076443 A1 * | 4/2003 | Takatori | 348/536 |
| 2003/0137586 A1 | 7/2003 | Lewellen | |
| 2003/0222982 A1 | 12/2003 | Hamdan et al. | |
| 2003/0227777 A1 | 12/2003 | Schofield | |
| 2004/0012488 A1 | 1/2004 | Schofield | |
| 2004/0016870 A1 | 1/2004 | Pawlicki et al. | |
| 2004/0032321 A1 | 2/2004 | McMahon et al. | |
| 2004/0051634 A1 | 3/2004 | Schofield et al. | |
| 2004/0128065 A1 | 7/2004 | Taylor et al. | |
| 2004/0200948 A1 | 10/2004 | Bos et al. | |
| 2005/0078389 A1 | 4/2005 | Kulas et al. | |
| 2005/0134966 A1 | 6/2005 | Burgner | |
| 2005/0134983 A1 | 6/2005 | Lynam | |
| 2005/0146792 A1 | 7/2005 | Schofield et al. | |
| 2005/0169003 A1 | 8/2005 | Lindahl et al. | |
| 2005/0195488 A1 | 9/2005 | McCabe et al. | |
| 2005/0200700 A1 | 9/2005 | Schofield et al. | |
| 2005/0232469 A1 | 10/2005 | Schofield et al. | |
| 2005/0264891 A1 | 12/2005 | Uken et al. | |
| 2006/0018511 A1 | 1/2006 | Stam et al. | |
| 2006/0018512 A1 | 1/2006 | Stam et al. | |
| 2006/0028731 A1 | 2/2006 | Schofield et al. | |
| 2006/0050018 A1 | 3/2006 | Hutzel et al. | |
| 2006/0061008 A1 | 3/2006 | Karner et al. | |
| 2006/0082192 A1 | 4/2006 | Dubay et al. | |
| 2006/0091813 A1 | 5/2006 | Stam et al. | |
| 2006/0103727 A1 | 5/2006 | Tseng | |
| 2006/0164230 A1 | 7/2006 | DeWind et al. | |
| 2006/0250501 A1 | 11/2006 | Wildmann et al. | |
| 2007/0023613 A1 | 2/2007 | Schofield et al. | |
| 2007/0104476 A1 | 5/2007 | Yasutomi et al. | |
| 2007/0109406 A1 | 5/2007 | Schofield et al. | |
| 2007/0109651 A1 | 5/2007 | Schofield et al. | |
| 2007/0109652 A1 | 5/2007 | Schofield et al. | |
| 2007/0109653 A1 | 5/2007 | Schofield et al. | |
| 2007/0109654 A1 | 5/2007 | Schofield et al. | |
| 2007/0120657 A1 | 5/2007 | Schofield et al. | |
| 2007/0176080 A1 | 8/2007 | Schofield et al. | |
| 2008/0158333 A1 * | 7/2008 | Krisbergh et al. | 348/14.01 |
| 2008/0180529 A1 | 7/2008 | Taylor et al. | |
| 2009/0113509 A1 | 4/2009 | Tseng et al. | |
| 2009/0300698 A1 * | 12/2009 | Quigley et al. | 725/114 |
| 2010/0045797 A1 | 2/2010 | Schofield et al. | |
| 2010/0097469 A1 | 4/2010 | Blank et al. | |
| 2010/0162070 A1 * | 6/2010 | Das et al. | 714/751 |

(56) References Cited

U.S. PATENT DOCUMENTS

| | | | |
|---|---|---|---|
| 2011/0136523 A1* | 6/2011 | Kim et al. | 455/501 |
| 2011/0188122 A1 | 8/2011 | Habibi et al. | |

FOREIGN PATENT DOCUMENTS

| | | |
|---|---|---|
| EP | 0788947 | 8/1997 |
| FR | 2641237 | 7/1990 |
| JP | 59114139 | 7/1984 |
| JP | 6079889 | 5/1985 |
| JP | 6080953 | 5/1985 |
| JP | 6272245 | 5/1987 |
| JP | 62131837 | 6/1987 |
| JP | 6414700 | 1/1989 |
| JP | 1141137 | 6/1989 |
| JP | 0550883 | 3/1993 |
| JP | 0577657 | 3/1993 |
| JP | 6227318 | 8/1994 |
| JP | 06267304 | 9/1994 |
| JP | 06276524 | 9/1994 |
| JP | 06295601 | 10/1994 |
| JP | 0732936 | 2/1995 |
| JP | 0747878 | 2/1995 |
| JP | 07052706 | 2/1995 |
| JP | 0769125 | 3/1995 |
| JP | 07105496 | 4/1995 |
| JP | 09205414 | 8/1997 |
| WO | WO8605147 | 9/1986 |
| WO | WO9419212 | 9/1994 |
| WO | WO9638319 | 12/1996 |
| WO | WO9735743 | 10/1997 |
| WO | WO9814974 | 4/1998 |
| WO | WO9914088 | 3/1999 |
| WO | WO9923828 | 5/1999 |
| WO | WO2005019873 | 3/2005 |
| WO | WO2007081407 | 7/2007 |
| WO | WO2007111984 | 10/2007 |
| WO | WO2009073054 | 6/2009 |
| WO | WO2010099416 | 9/2010 |
| WO | WO2010114825 | 10/2010 |
| WO | WO2010124064 | 10/2010 |
| WO | WO2011044312 | 4/2011 |

OTHER PUBLICATIONS

Tokimaru et al., "CMOS Rear-View TV System with CCD Camera", National Technical Report vol. 34, No. 3, pp. 329-336, Jun. 1988 (Japan).

* cited by examiner

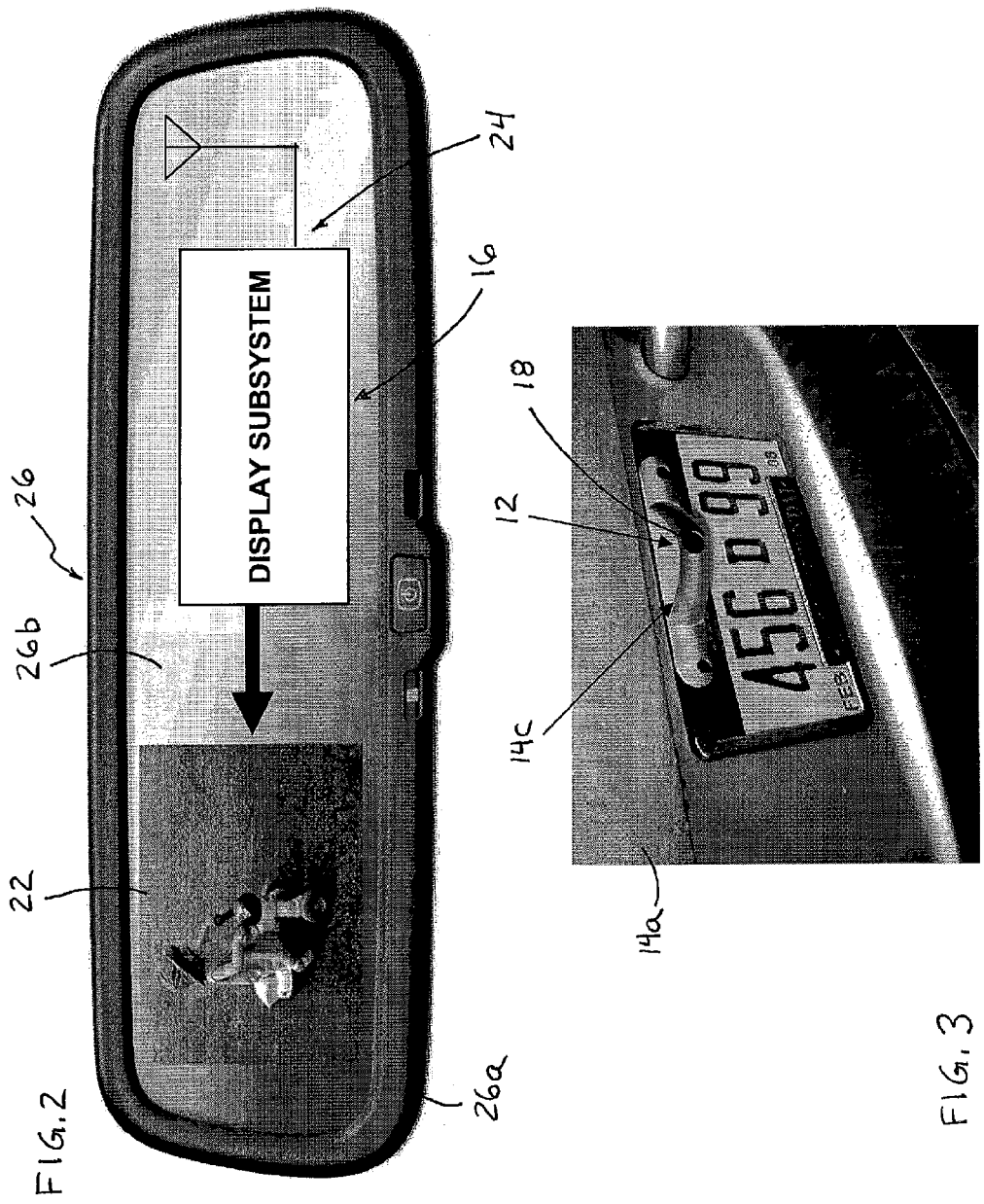

ADAPTABLE WIRELESS VEHICLE VISION SYSTEM BASED ON WIRELESS COMMUNICATION ERROR

CROSS REFERENCE TO RELATED APPLICATION

The present application claims the filing benefit of U.S. provisional application Ser. No. 61/303,054, filed Feb. 10, 2010, which is hereby incorporated herein by reference in its entirety.

FIELD OF THE INVENTION

The present invention relates generally to the field of vision systems and display systems for vehicles.

BACKGROUND OF THE INVENTION

It is known to provide a video display screen at an interior rearview mirror assembly of a vehicle, such as, for example, a video display screen of the type disclosed in U.S. Pat. Nos. 6,690,268; 6,428,172 and/or 6,175,300, which are hereby incorporated herein by reference in their entireties. It has also been suggested to place one or more cameras around and about the vehicle to provide an improved backup aid and/or blind spot detection and alert system, such as described in U.S. Pat. Nos. 5,289,321; 5,670,935 and/or 7,111,968, which are hereby incorporated herein by reference in their entireties.

SUMMARY OF THE INVENTION

The present invention provides an imaging or vision system, with a video display screen (such as a video display screen disposed at or in or near the interior rearview mirror assembly of the vehicle) that displays video images captured by a camera or image sensor of the vehicle, such as a rearward facing camera of a reverse backup-aid rear vision system present on the vehicle for capturing images of the rear blind zone area immediately rearward and to the sides of the vehicle for assisting the driver of the equipped vehicle in making a reversing maneuver. In accordance with the present invention, the camera or camera subsystem wirelessly communicates with the video display screen or subsystem and the video display screen viewable to the driver of the vehicle (preferably a video mirror display) displays video images captured by the rearward-facing video camera during a reversing maneuver to provide real-time video of a rearward blind zone for monitoring potential hazards present to the rear (such as children or obstacles or the like) as part of a backup-assist functionality when the driver is executing a reverse back-up maneuver. The camera subsystem may adjust a compression factor of the captured image data and wirelessly transmit or communicate the compressed image data to the video display subsystem responsive to one or more signals received from the camera subsystem.

According to an aspect of the present invention, a vehicular vision system includes a rearward facing camera at a rear portion of a vehicle and a video display screen operable to display video images captured by the rearward facing camera (such as in response to the driver of the vehicle shifting a gear actuator to a reverse gear position to initiate a reversing maneuver), preferably utilizing the full field of view of the rearward facing camera. The camera or camera subsystem may capture image data and compress image data for communicating or transmitting the compressed image data to the display screen or display subsystem. The display screen or subsystem may decompress the compressed image data and display the video images for viewing by the driver of the vehicle. The display screen or subsystem communicates or transmits a signal to the camera that is indicative of a transmission error or decompression error or image data error that is detected in the transmitted image data, whereby the camera or camera subsystem may adjust the decompression factor responsive to the signal from the display screen or subsystem.

Optionally, and preferably, the video display screen may be disposed at or in an interior rearview mirror assembly of the vehicle and behind a mirror reflective element. Optionally, the video display screen, when operated to display images or information, may be viewable through a transflective mirror reflector of a reflective element of the mirror assembly.

Therefore, the present invention provides two-way communication (such as two-way wireless communication) between the camera subsystem and the display subsystem. The camera subsystem may adjust the decompression factor of the image data responsive to a signal from the display subsystem and thus may enhance or optimize transmission of the image data to the display subsystem.

These and other objects, advantages, purposes and features of the present invention will become apparent upon review of the following specification in conjunction with the drawings.

BRIEF DESCRIPTION OF THE DRAWINGS

FIG. 2 is a front elevation of a mirror assembly with a video display screen incorporated therein in accordance with the present invention;

FIG. 3 is a perspective view of a camera mounted at a rear portion of a vehicle and having a rearward field of view in accordance with the present invention.

DESCRIPTION OF THE PREFERRED EMBODIMENTS

Figure 1:
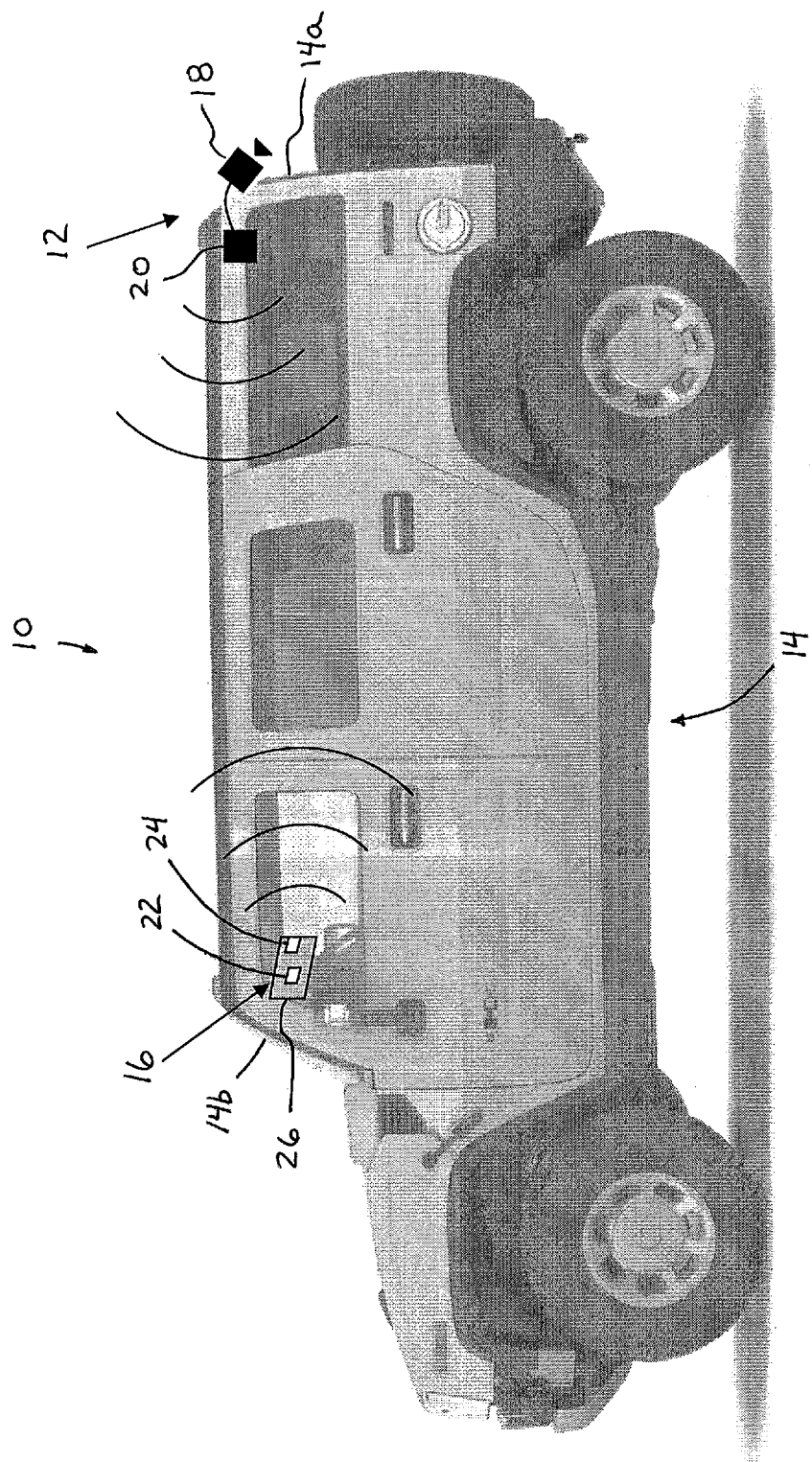
FIG. 1 is a side elevation of a vehicle equipped with the rear vision and display system in accordance with the present invention.

Referring now to the drawings and the illustrative embodiments depicted therein, a vehicular vision system 10 includes a rearward facing video camera subsystem or module 12 disposed at a rear portion 14a of a vehicle 14, and a video display subsystem or module 16 disposed at an interior cabin of the vehicle and at or near the windshield 14b of the vehicle (FIGS. 1 and 2). The camera subsystem 12 includes an imaging sensor or camera 18 and a transmitter/transceiver device 20, and the display subsystem 16 may include a video display screen 22 and a transmitter/transceiver device 24. The camera subsystem 12 communicates wirelessly with the display subsystem or module 16 and the vision system 10 provides two-way communication between the camera subsystem and display subsystem. The vision system 10 is operable to adjust the data transmission rate or data compression to enhance or optimize the data transmission from the camera subsystem 12 to the display subsystem 16, as discussed below.

The video display subsystem 16 may include or may be responsive to a video image processor (which may be operable to crop the video images, may be operable for machine vision objection detection, may be operable for electronic image distortion reduction and/or may be operable for graphic overlay generation) and is operable to display video images captured by the rearward facing camera 18 for viewing by the driver of the vehicle when the driver is normally operating the vehicle such as by utilizing aspects of the vision systems described in PCT Application No. PCT/US10/47256, filed Aug. 31, 2010, published on Mar. 10, 2011 as international publication No. WO 2011/028686, which is hereby incorporated herein by reference in its entirety. The video display screen 22 may, responsive to the driver of the vehicle shifting the gear actuator of the vehicle to a reverse gear position to initiate a reversing maneuver, display video images captured by the rearward facing camera 18 of the scene occurring behind the vehicle to assist the driver in making a reversing maneuver, as discussed below. The rearward facing camera 18 may be disposed at rear portion 14a of the vehicle 14, and may be disposed at a license plate bracket 14c (FIG. 3) or the like, such as by utilizing aspects of the vision systems described in U.S. patent application Ser. No. 11/672,070, filed Feb. 7, 2007, which is hereby incorporated herein by reference in its entirety.

In the illustrated embodiment, the video display subsystem 16 and video display screen 22 are disposed at an interior rearview mirror assembly 26 of the vehicle (such as in a mirror casing 26a and behind a reflective element 26b of the mirror assembly 26 such that displayed information is viewable through the reflective element of the mirror assembly, such as shown in FIG. 2). Optionally, the video display screen 22 may be disposed elsewhere in the vehicle, such as at or in an accessory module or windshield electronics module or overhead console or center stack region of the instrument panel or elsewhere at the instrument panel or other areas of the vehicle, while remaining within the spirit and scope of the present invention. The vision system and/or video display subsystem and/or rearward facing camera and/or video processor and/or backup assist system may utilize aspects of the systems described in U.S. Pat. Nos. 5,550,677; 5,760,962; 5,670,935; 6,201,642; 6,396,397; 6,498,620; 6,717,610; 6,757,109; 7,005,974; 7,265,656; 6,690,268; 5,786,772; 5,929,786 and/or 6,198,409, and/or PCT Application No. PCT/US10/47256, filed Aug. 31, 2010 published on Mar. 10, 2011 as international publication No. WO 2011/028686, which are hereby incorporated herein by reference in their entireties. Optionally, the vision system and display subsystem may utilize aspects of the blind spot detection systems of the types described in U.S. Pat. Nos. 7,881,496; 7,720,580; 7,038,577; 6,882,287; 5,929,786 and/or 5,786,772, which are all hereby incorporated herein by reference in their entireties.

Typically, such a rearward facing camera for a rear vision system or backup assist system is activated responsive to the driver of the equipped vehicle shifting the gear actuator into a reverse gear position, whereby video images captured by the camera are displayed at the video display screen. When the reversing maneuver is completed, such as when the driver of the vehicle finally shifts the gear actuator out of the reverse gear position (and into either a park or neutral position or a forward gear position), display of the images captured by the camera ceases and the camera is often deactivated.

Installation of reverse-aid camera systems in existing vehicles typically involves routing new wiring between the display near the front of the vehicle, and the camera at the rear of the vehicle. This process is labor-intensive and therefore expensive, and usually proves to be too complex an undertaking for the typical end-user. One solution to the problem is to transmit the signal from the camera to the display wirelessly. This reduces the wiring required for installation to power for the camera and for the display. Power for the camera can be readily obtained from the reverse-light circuit (or other circuit or wiring present at the rear of the vehicle, such as wiring for other electrically powered lights or accessories present at the rear of the vehicle), and power for the display can be made available from the fuse panel or cigarette lighter (or other circuit or wiring present at or near the instrument panel or mirror assembly or headliner or console at the interior cabin of the vehicle). Existing wireless camera systems for vehicles typically use analog video signals, and are susceptible to interference during transmission of the image signals. Also, since the signal transmission is one-way (from the camera to the display), there is no way for the system to adapt to overcome interference. Such solutions can become non-functional or poorly functional in the presence of even minor signal degradation.

Figure 4:
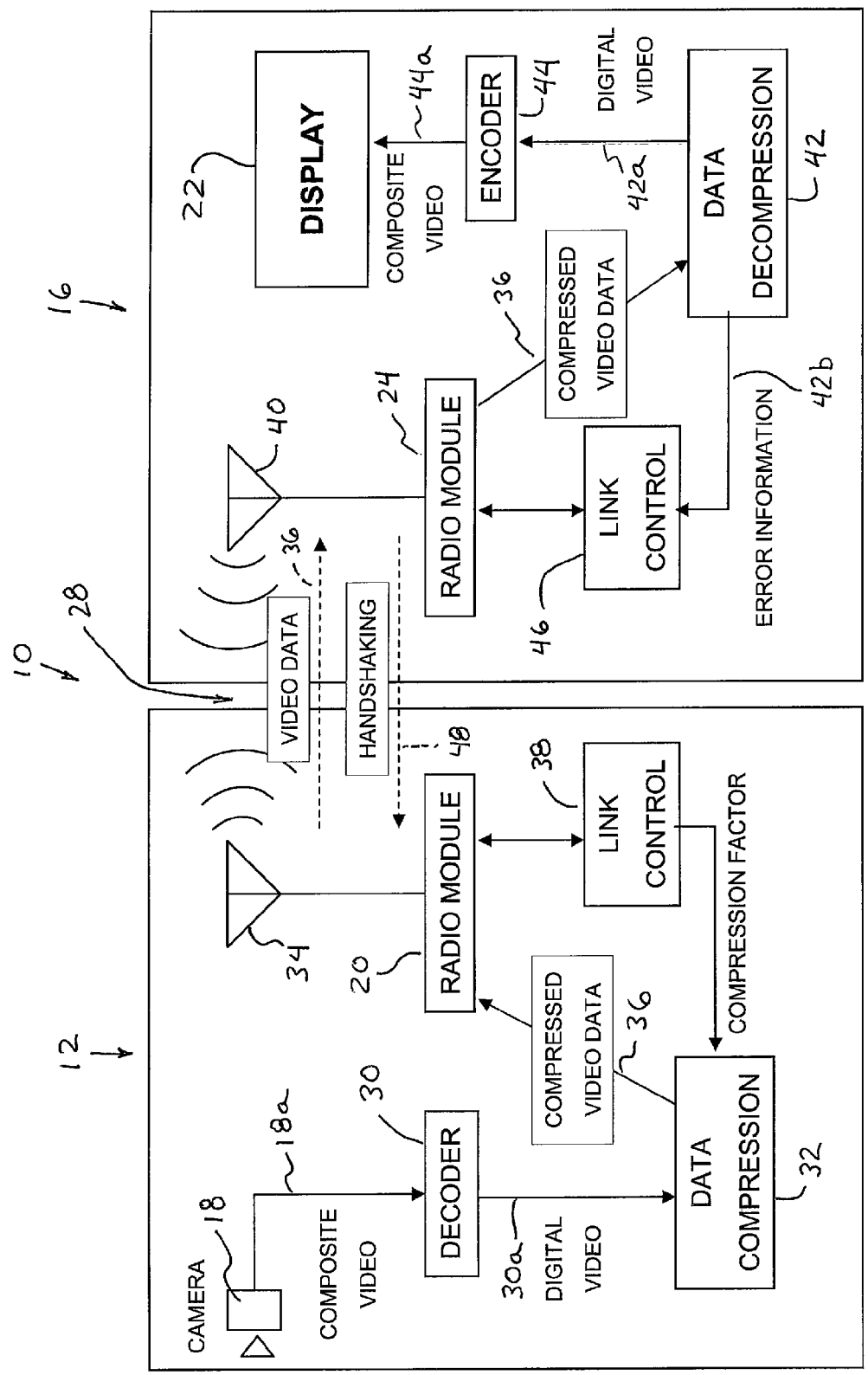
FIG. 4 is a block diagram of the camera subsystem and display subsystem and communication therebetween in accordance with the rear vision and display system of the present invention.

The present invention provides a wireless two-way communication between the camera subsystem and the display subsystem to adapt the communication responsive to interference or loss/reduction in signal quality or the like. As shown in FIG. 4, vision system 10 comprises camera subsystem 12 and display subsystem 16, which communicate via the two-way wireless communication link 28. Camera subsystem 12 comprises camera 18, which captures image data of its rearward field of view, and transmitter/transceiver/radio module or device 20, which transmits and receives wireless communications or signals. In the illustrated embodiment, camera subsystem 12 includes a decoder 30, which receives a composite video signal 18a from camera 18, and converts the signal to a digital signal 30a. The digital video signal 30a is compressed via a data compression device or element or function or processor 32 (such as a compression digital signal processor (DSP) or the like), and radio module 20 (which includes an antenna or transmitting/receiving element 34) communicates the compressed video image data 36 to display subsystem 16. A link control 38 of camera subsystem 12 communicates with the radio module 20 and is operable to adjust the data compression factor responsive to a communication or signal received from display subsystem 16, as discussed below. Although shown and described as separate elements, clearly the elements and devices of the camera subsystem may be incorporated as circuitry on a printed circuit board or the like, while remaining within the spirit and scope of the present invention.

Display subsystem 16 comprises video display screen 22, which displays video images for viewing by the driver of the equipped vehicle when the display subsystem is normally mounted or installed in the vehicle and when the driver of the vehicle is normally operating the vehicle, and transmitter/transceiver/radio module or device 24, which transmits and receives wireless communications or signals. Radio module 24 (which includes an antenna or transmitting/receiving element 40) communicates with radio module 20 via the wireless communication link 28. In the illustrated embodiment, the compressed video data 36 received by radio module 24 is decompressed via a data decompression device or element or function 42, and the decompressed digital video data or signal 42a is encoded via an encoder 44, whereby a composite video signal 44a is communicated to the video display screen 22 (such as to a display driver of the display screen or module) for display of the video images to the driver of the vehicle. A link control 46 of display subsystem 16 communicates with the data decompression element 42 and the radio module 24 and is operable to adjust a communication signal or "handshaking" signal 48 communicated to radio module 20, such as in response to error information 42b from data decompression element 42 (for example, the radio module may communicate or transmit signals responsive to receipt of image data from the camera subsystem and/or responsive to detection of errors in the received image data, and/or the radio module may periodically communicate or transmit signals even when no image data is received so that the camera subsystem may receive signals indicative of non-reception of image data and may retransmit image data that may not have been received by the display subsystem). Although shown and described as separate elements, clearly the elements and devices of the display subsystem may be incorporated as circuitry on a printed circuit board or the like, while remaining within the spirit and scope of the present invention.

During operation of the vision system of the present invention, the camera 18 captures image data and the camera video is converted to a digital data stream via decoder 30 (or optionally the camera generates a digital output signal that is communicated directly to the compression element or processor). The data stream is compressed, such as by using MJPEG, MPEG, or other suitable or similar video compression scheme or algorithm. Optionally, and desirably, a "lossy" compression scheme or protocol may be used, resulting in relatively high compression ratios with a relatively small or slight degradation in video quality as a result. The amount of compression is adjustable—higher compression reduces the amount of data to be transmitted, but results in lower image quality as a trade-off. Any suitable data compression device, such as, for example, an FPGA or DSP device or the like, may be used to perform data compression and decompression.

The compressed data or bitstream is transmitted to the display subsystem or module over the two-way wireless communication link, such as via a radio link or the like. Periodically, the display subsystem sends information or signals back to the camera subsystem over the wireless communication link to acknowledge receipt of the data and to report transmission errors to the link control 38 of the camera subsystem.

In the camera subsystem, the link control or controller 38 controls the data transmission rate of the transmitter or radio and the amount of data compression used. If the communication link exhibits excessive errors in transmission, the link controller (responsive to a communication signal from the display subsystem indicative of such detected or determined errors) decreases the data transmission rate and increases the data compression rate. If the communication link quality improves, the link controller (responsive to a communication signal from the display subsystem indicative of such quality improvement) increases the data transmission rate and decreases the data compression rate to provide enhanced video image quality when there is little or no signal interference. In the display subsystem, the received image data is decompressed and sent to the display screen. The number of errors in the received image data are reported back to the camera subsystem through the return path of the link control 46 and the wireless communication link or radio link 28 to the link control 38 of camera subsystem 12.

Although the vision system is shown in FIG. 4 as having a camera that produces composite video images, clearly, the camera may produce a digital video signal or digital image data that is communicated to the compression element or device or digital signal processor. The illustrated embodiment depicts a modular approach, but it is envisioned that some of the functions or elements or components may be integrated to reduce the number of signal conversions taking place. For example, a digital video signal, such as BT.656 or similar signal or protocol, may be used directly between the camera and the compression element or processor. Likewise, a digital video signal may be used by the display driver instead of a composite video signal (whereby the digital output of the decompression processor or element is communicated to the display driver without the encoder). Optionally, a common digital signal processor (DSP) or FPGA device or the like may function to perform the data decompression and to drive the display screen or LCD directly with a parallel digital RGB signal or the like.

Utilizing this means of wireless communication link quality feedback, the vision system of the present invention can continually and automatically enhance or optimize the amount of video compression and can enhance or optimize the data transmission rate to compensate for changes in communication link quality. In this manner, the vision system can better tolerate radio interference or the like, while still providing information to the driver about objects that may be behind the vehicle. Although the loss of video image quality at high compression ratios may be seen as objectionable in video used for entertainment purposes, it would not degrade the usefulness of a video reverse-aid system as much as a degraded analog signal would.

The vision system of the present invention thus allows for correction or adjustment of the data transmission and/or retransmission of a data packet or packets, responsive to a detection of errors in received transmitted data (or responsive to the display subsystem not receiving any transmission). For example, the display subsystem may communicate to the camera subsystem continuously or periodically and, if the communicated signal (received by the camera subsystem) is indicative of the display subsystem receiving image data with errors or not receiving image data (at or after a time when the camera subsystem transmitted data), the camera subsystem may retransmit the data that was not received by the display subsystem and/or may adjust the compression ratio and/or transmission rate for the transmitted image data. The system may send or communicate such data at a bit rate that is lower than what the radio link is capable of communicating, so there can be a period of time in which the system can indicate that the data packet needs to be resent and the system can resend the data packet. For example, if a 300 Kilobyte data packet is transmitted and the system has a bandwidth capability of around 500 Kilobytes, there is a period of time available for resending a data packet that is not received (or if it is received but there are substantial errors detected in the received data) and the short period of time that the packet is delayed will not be perceptible to the driver or person viewing the displayed images.

Thus, if the transmitted data or data packet is not received or is received with too many transmission errors (such as greater than a threshold amount of errors), then the system can automatically adjust the compression ratio or factor to reduce the transmission bandwidth for sending or transmitting the video image data. Optionally, other processing may be performed or adjusted responsive to such error detections. For example, as additional or optional means of reducing the bandwidth required for communicating the image data to the display subsystem, the vision system may temporarily reduce or eliminate portions of the video signal before compression. For example, color information may be reduced or eliminated, or the image resolution may be reduced (such as by reducing the resolution by half or by any other suitable or desired amount) temporarily either in X or Y or both, or the image capture frame rate may be reduced, such as from a typical 30 frames per second (fps) down to about 15 fps or any other suitable or desired frame rate, or any combination of the various data reduction means discussed herein and equivalents thereof. Thus, instead of losing the images entirely (and instead of displaying images with substantial transmission/compression/decompression errors), the system may automatically reduce the image quality or video quality so that the displayed images may not be as clear or high resolution or colored or the like, but are up to date or substantially up to date images to assist the driver of the vehicle in performing the reversing (or other driving) maneuver.

Therefore, the vision system of the present invention provides wireless communication between a camera subsystem (such as at the rear of the vehicle, but optionally, the camera subsystem or subsystems may be disposed elsewhere at or on or in the vehicle) and a display subsystem (such as at the interior rearview mirror of the vehicle, but optionally, the display subsystem may be disposed elsewhere at or on or in the vehicle where it is viewable by the driver or occupant of the vehicle). The wireless communication link provides two-way communication between the camera subsystem (and optionally two or more camera subsystems, such as a rear backup aid camera subsystem, a cabin monitoring camera subsystem, a side object detection camera subsystem, a forward facing camera subsystem and/or the like, disposed at selected areas or portions of the vehicle) and the display subsystem. For example, compressed digital video image data may be communicated from the camera subsystem to the display subsystem, and the display subsystem may communicate signals to the camera subsystem that are indicative of a degree of transmission error or decompression error in the communicated compressed digital video image data that is received and decompressed and encoded by the display subsystem. The camera subsystem may adjust the compression factor in the compressed digital video image data responsive to the communicated signals from the display subsystem. Thus, the image data compression and/or data transmission rate and/or image size and/or image color and/or image capture frame rate and/or the like may be adjusted, such as by reducing the compression factor and/or increasing the image size, color and/or frame rate or the like when there is little or no interference or transmission errors present or detected in the communicated compressed data and by increasing the compression factor and/or decreasing the image size, color and/or frame rate or the like when interference or transmission errors are present or detected, in order to enhance image quality when little or no interference or errors are present or detected and to increase compression and thus decrease image quality when it may be needed or desired to enhance transmission of the compressed image data. The potential degradation in displayed image quality when the images are compressed an increased amount (or otherwise processed to reduce the required bandwidth for transmission) may not be readily discernible to the driver of the vehicle when viewing the displayed images, such as during a reversing maneuver or the like. Thus, the present invention provides enhanced image data transmission and adjusts the compression factor or other properties or characteristics of the image data or image processing to maintain suitable image data transmission while maintaining a suitable image display quality. Although the vision system of the present invention is applicable to and suitable for aftermarket applications (where each module may be electrically connected to existing vehicle wiring at or near where the respective module is disposed), clearly, the vision system of the present invention may be suitable for OEM applications (where the modules or components or circuitry may be incorporated in existing components or accessories or may be electrically connected to the vehicle power source via any suitable means), while remaining within the spirit and scope of the present invention.

Preferably, the display subsystem of the vision or imaging and display system of the present invention comprises part of or is incorporated in an interior rearview video mirror assembly, such as an interior rearview video mirror assembly utilizing aspects of the systems and assemblies described in U.S. Pat. Nos. 6,690,268; 6,902,284; 7,184,190; 7,195,381; 7,255,451; 7,274,501; 7,338,177; 7,370,983; 7,490,007; 7,540,620; and/or 7,855,755, and/or U.S. patent application Ser. No. 12/578,732, filed Oct. 14, 2009; Ser. No. 10/538,724, filed Jun. 13, 2005 and published Mar. 9, 2006 as U.S. Publication No. US-2006-0050018; Ser. No. 11/226,628, filed Sep. 14, 2005, published Mar. 23, 2006 as U.S. Publication No. 2006/0061008, now abandoned; Ser. No. 09/585,379, filed Jun. 1, 2000; and/or Ser. No. 10/207,291, filed Jul. 29, 2002 and published Jan. 9, 2003 as U.S. Publication No. 2003-0007261, and/or PCT Application No. PCT/US2010/25545, filed Feb. 26, 2010 and published on Sep. 2, 2010 as International Publication No. WO 2010/099416, which are all hereby incorporated herein by reference in their entireties. Preferably, the camera subsystem of the vision or imaging and display system of the present invention comprises a rear backup camera subsystem having a rearward facing or viewing imaging sensor that has a rearward field of view rearward of the vehicle with respect to the direction of forward travel of the vehicle (such as via a camera and/or camera system utilizing aspects of the systems and assemblies described in U.S. Pat. Nos. 7,265,656; 7,111,968; 7,005,974; 5,670,935; 5,289,321; 5,550,677; 5,670,935; 5,760,962; 5,786,772; 5,929,786; 6,198,409; 6,201,642; 6,396,397; 6,498,620; 6,690,268; 6,717,610 and/or 6,757,109, which are hereby incorporated herein by reference in their entireties). The display subsystem and camera subsystem are operable to capture images or image data representative of the area to the rear of the equipped vehicle and to display the captured video images at the mirror assembly (such as at the mirror reflective element via display of the video images through a transflective mirror reflective element of the interior rearview video mirror assembly) for viewing by the driver of the vehicle when the driver is normally operating the vehicle (such as during a reversing maneuver of the vehicle). The vision or imaging and display system of the present invention is operable to process the captured image data and to adjust the image data and/or the transmission of the image data to optimize the operation of the vision system and the display of the video images to the driver of the equipped vehicle.

For example, a vehicular vision system of the present invention may comprise a camera subsystem and a display subsystem. The camera subsystem includes an imaging sensor disposed at the equipped vehicle and having a field of view exterior the vehicle. The imaging sensor captures image data and the camera subsystem wirelessly transmitting the image data. The display subsystem comprises a video display screen disposed in the equipped vehicle for displaying images for viewing by a driver of the equipped vehicle when the driver is normally operating the equipped vehicle. The display subsystem is operable to receive the transmitted image data from the camera subsystem. The display subsystem transmits an error signal responsive to processing of the image data and the camera subsystem receives the error signal and at least one of (a) adjusts a compression factor of the image data responsive to the error signal and (b) adjusts a transmission rate of the image data responsive to the error signal. Optionally, the camera subsystem, responsive to the error signal being indicative of a detection of an increase in errors in the image data, may at least one of (a) reduce or eliminate portions of the video image data before compression, (b) reduce or eliminate color information, (c) reduce image resolution and (d) reduce an image capture frame rate. Optionally, the camera subsystem, responsive to the error signal, may, such as via processing of the image data, adjust a bandwidth required to wirelessly transmit the image data.

The video display screen device or module may comprise any suitable type of video screen and is operable to display images in response to an input or signal from a control or imaging system. For example, the video display screen may comprise a multi-pixel liquid crystal module (LCM) or liquid crystal video display (LCD), preferably a thin film transistor (TFT) multi-pixel liquid crystal video display (such as discussed below), or the video screen may comprise a multi-pixel organic electroluminescent video display or a multi-pixel light emitting diode (LED) video display, such as an organic light emitting diode (OLED) or inorganic light emitting video diode display or the like, or an electroluminescent (EL) video display or the like.

The video display screen preferably provides a display screen or area that is greater than at least 2.4 inches diagonal, and more preferably greater that at least about 3.3 inches diagonal and more preferably greater than at least about 3.5 inches diagonal and less than or equal to about 4.7 inches diagonal. The video display screen may include QVA size (320×240 pixel) output pins or WQVA size (480×234 pixel) output pins, and may provide a resolution of at least about 75,000 pixels, more preferably at least about 85,000 pixels, and more preferably at least about 95,000 pixels or thereabouts. The video display screen may provide a display screen or area of any suitable aspect ratio, such as an aspect ratio of about 4:3 or 15:9 or 16:9 or the like, without affecting the scope of the present invention. The industry standard that can be used includes 4:3 screen resolution provided by VGA (640×480), SVGA (800×600), XGA (1024×768) or SXGA (1280×1024), and includes 16:9 screen resolution provided by similar standards or WXGA (1366×768). Preferably, the video display screen provides a contrast ratio preferably of at least about 250:1, more preferably at least about 650:1, and more preferably at least about 900:1 or 1,000:1 or thereabouts. The higher contrast ratio allows for enhanced viewability of the displayed cropped images while providing sufficient darkness at the non-video-displaying portion of the display screen so that the non-video-displaying portion of the screen is not readily viewable or discernible through the transflective mirror reflector to a person viewing the mirror reflective element when the mirror assembly is normally mounted in a vehicle and so that driver rear vision using the mirror reflector is enhanced or maximized.

In a preferred embodiment, and such as for use in an interior rearview video mirror assembly (such as a video mirror utilizing aspects of the systems described in U.S. Pat. Nos. 7,855,755; 6,690,268; 6,902,284; 7,184,190; 7,195,381; 7,255,451; 7,274,501; 7,338,177; 7,370,983; 7,490,007; and/or 7,540,620, and/or U.S. patent application Ser. No. 12/578,732, filed Oct. 14, 2009; Ser. No. 10/538,724, filed Jun. 13, 2005 and published Mar. 9, 2006 as U.S. Publication No. US-2006-0050018; Ser. No. 11/226,628, filed Sep. 14, 2005, published Mar. 23, 2006 as U.S. Publication No. 2006/0061008, now abandoned; Ser. No. 09/585,379, filed Jun. 1, 2000; and/or Ser. No. 10/207,291, filed Jul. 29, 2002 and published Jan. 9, 2003 as U.S. Publication No. 2003-0007261, and/or PCT Application No. PCT/US2010/25545, filed Feb. 26, 2010 and published on Sep. 2, 2010 as International Publication No. WO 2010/099416, which are all hereby incorporated herein by reference in their entireties), the video display screen may provide a resolution of about 480×RGB×272, with a striped pixel arrangement. The active area of the display screen may be about 77.76 (W)×43.52 (H), with a pixel pitch of about 0.162 (W)×0.16 (H). The active area diagonal dimension may be about 3.51 inches or thereabouts, with a viewing direction at 12 o'clock. The interface to the video display screen may comprise a 24 bit parallel interface, and the video display screen may provide a 16.7 million color resolution. The display may comprise a thin film transistor (TFT) liquid crystal display (LCD), which is a normally white, transmissive type of display. The display screen may have a minimum of about 55 degrees viewing angle in all directions, and may have a contrast ratio of at least about 1,000:1. The video display screen, when operated to display video images, preferably may have an intensity as viewed through the transflective mirror reflector of the video mirror of at least about 1,500 candelas per square meter ($cd/m^2$) nominal.

Optionally, and desirably, when the video display is part of a video mirror assembly, a contrast ratio (such as measured in accordance with ANSI IT7.215-1992: Data Projection Equipment and Large Screen Data Displays—Test Methods and Performance Characteristics available from the American National Standards Association of Washington D.C., USA, which is hereby incorporated herein by reference in its entirety) of at least about 500:1 is preferred, at least about 750:1 more preferred and at least about 1,250:1 most preferred. Dynamic contrast control (such as known in the display art and such as is disclosed by H. Chen et al. in "Locally pixel-compensated backlight dimming on LED-backlit LCD TV", JSID 15/12 (2007), pp. 981-988, which is hereby incorporated herein by reference in its entirety) may be used in displays and/or systems in accordance with the present invention. For example, contrast within the individual video image frames (or sequence of video frames) being displayed (simultaneous contrast) can be increased when the video screen backlighting is locally dimmed (such as by locally and selectively dimming backlighting provided by individual banks of backlighting light emitting diodes (LEDs) or local grouping of backlighting LEDs).

Optionally, a camera-based cross traffic feature can be provided whereby when a vehicle, vertically parked between adjacent parked vehicles (such as in the likes of a parking lot or the like), commences reversing out of the parking space, the rearward facing camera and video processor function to detect vehicles or objects to the sides of the equipped vehicle and the video display screen may alert the driver as to the presence of a detected sideward vehicle or object, such as by utilizing aspects of the systems described in PCT Application No. PCT/US2010/25545, filed Feb. 26, 2010 and published on Sep. 2, 2010 as International Publication No. WO 2010/099416, which is hereby incorporated herein by reference in its entirety. Optionally, during a reversing maneuver, if an object is detected (such as by machine vision processing of the captured images via an image processor such as described in U.S. Pat. Nos. 7,881,496; 7,720,580; and/or 7,038,577, which are all hereby incorporated herein by reference in their entireties) at or toward one side of the vehicle, the video display screen may display that portion of the captured rearward image to enhance the driver's cognitive awareness of the presence of the detected object at or near the rear side of the equipped vehicle. Optionally, such a display may be provided in conjunction with an icon or the like to assist the driver in recognizing where the displayed object is located relative to the vehicle.

The video display screen device or module may comprise any type of video screen and is operable to display images in response to an input or signal from a control or imaging system. For example, the video display screen may comprise a multi-pixel liquid crystal module (LCM) or liquid crystal display (LCD), preferably a thin film transistor (TFT) multi-pixel liquid crystal video display (such as discussed below), or the screen may comprise a multi-pixel organic electroluminescent video display or a multi-pixel light emitting diode (LED) video display, such as an organic light emitting diode (OLED) or inorganic light emitting diode display or the like, or an electroluminescent (EL) video display, or the like. For example, the video display screen may comprise a video screen of the types disclosed in U.S. Pat. Nos. 7,855,755; 7,370,983; 7,338,177; 7,274,501; 7,255,451; 7,195,381; 7,184,190; 6,902,284; 6,690,268; 6,428,172; 6,420,975; 5,668,663 and/or 5,724,187, and/or U.S. patent application Ser. No. 12/578,732, filed Oct. 14, 2009; Ser. No. 10/538,724, filed Jun. 13, 2005 and published Mar. 9, 2006 as U.S. Publication No. US-2006-0050018; Ser. No. 11/226,628, filed Sep. 14, 2005 by Karner et al. published Mar. 23, 2006 as U.S. Publication No. 2006/0061008, now abandoned; Ser. No. 09/585,379, filed Jun. 1, 2000; Ser. No. 10/207,291, filed Jul. 29, 2002 and published Jan. 9, 2003 as U.S. Publication No. 2003-0007261, and/or PCT Application No. PCT/US2010/25545, filed Feb. 26, 2010 and published on Sep. 2, 2010 as International Publication No. WO 2010/099416, which are hereby incorporated herein by reference in their entireties.

The camera or image sensor, such as a video camera or sensor, may comprise any suitable imaging sensor, such as a CMOS imaging array sensor, a CCD sensor or the like, such as the types disclosed in U.S. Pat. Nos. 5,550,677; 5,760,962; 6,396,397; 6,097,023; 5,877,897; and 5,796,094, and/or U.S. patent application Ser. No. 10/534,632, filed May 11, 2005, now U.S. Pat. No. 7,965,336, which are hereby incorporated herein by reference in their entireties. The camera may be part of or associated with one or more imaging systems of the vehicle, such as a reverse or backup aid system, such as a rearwardly directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974 and/or U.S. provisional application Ser. No. 61/436,397, filed Jan. 26, 2001, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle.

Optionally, the video display screen may be operable responsive to other cameras and/or navigation systems and/or the like, and may be operable at any time during operation of the vehicle. Thus, the video display screen may be operable during daytime and nighttime driving conditions and may be operable when the variable reflectivity reflective element is dimmed or darkened. Thus, the intensity of the display may be adjusted to account for a reduced transmissivity of the reflective element.

Optionally, and desirably, the intensity or brightness or contrast of the video display screen may be automatically adjusted in response to an ambient light sensor or glare detector, such as a sensor of the display screen device, or of the interior rearview mirror assembly or vehicle or of a console or module or the like, such as the types disclosed in U.S. Pat. Nos. 4,793,690 and/or 5,193,029, which are hereby incorporated herein by reference in their entireties. In applications where the display screen device is implemented with an electro-optic or electrochromic mirror reflective element assembly, the display screen device may be automatically adjusted in response to the ambient light sensor or glare detector associated with the electro-optic or electrochromic circuitry or system. The display intensity of the display screen may be adjusted in response to the photo sensor or light sensor, and may be increased during daytime lighting conditions and reduced at dusk or during nighttime lighting conditions. The intensity and/or contrast and/or brightness of the display may be substantially continuously adjusted or may be adjusted intermittently or in steps in response to the light sensor or sensors, such as by utilizing aspects of the displays described in U.S. Pat. Nos. 7,855,755; 7,370,983; 5,416,313 and 5,285,060, which are hereby incorporated herein by reference in their entireties.

In the illustrated embodiment, the interior rearview mirror assembly includes or houses the video display screen, which is disposed within the mirror casing and behind the reflective element. Optionally, the mirror reflective element may comprise a transflective mirror reflector such that the video display screen is operable to display information or images for viewing by the driver or other occupant or occupants of the vehicle through the transflective mirror reflector of the reflective element when the video display screen device is operated to display information and/or video images, and is substantially not viewable or discernible through the transflective mirror reflector of the reflective element when not operated to display information and/or video images, as discussed below. Optionally, the video display screen may be disposed elsewhere within the cabin of the vehicle, such as at or in an accessory module of the vehicle or windshield electronics module of the vehicle or an overhead console of the vehicle or the like, while remaining within the spirit and scope of the present invention.

Optionally, the video display screen (disposed behind a transflective mirror reflector of an electro-optic mirror reflective element of an interior rearview mirror assembly) may be operable to adjust the intensity of the displayed images in response to a degree of dimming of the electro-optic (such as electrochromic) reflective element of the mirror assembly. The video display screen thus may be adjusted responsive to an output signal of the glare light sensor or an output of the mirror reflective element dimming circuitry or the like. For example, as the reflective element is dimmed or darkened (such as in response to a detection of glare light at the mirror assembly) to reduce glare to the driver of the vehicle, the video display screen may be automatically brightened. Desirably, the video display screen is brightened relative to the degree of dimming so that the displayed images remain at a substantially constant intensity as viewed by the driver of the vehicle, so that the increasing/decreasing intensity of the video display is not readily discernible to the driver of the vehicle. Such an automatic intensity adjustment function is particularly suitable for a video display screen that may be operable in response to various camera inputs and/or navigation system inputs and/or the like, and not only responsive to a rear vision camera (where the dimming controls are typically deactivated when the vehicle is shifted into a reverse gear).

In such an application, the mirror dimming control may still be inhibited when the vehicle is shifted into a reverse gear, but will be active during other driving conditions, and the video display screen will also be active during reverse and forward driving conditions. Thus, when the video decoder (that may be part of the video display device or module) determines that there is a valid video signal, the video decoder may communicate to the mirror microprocessor to activate the back light of the display module, and the mirror circuitry and/or display circuitry may adjust the intensity of the video display screen in response to a detected ambient lighting condition and a detected glare lighting condition (and/or in response to a degree of dimming of the reflective element as set by the mirror circuitry). As the mirror reflective element is dimmed or darkened, the video display screen may re-brighten the video display intensity based on the EC coloring or dimming percentage in front of the video display screen. Likewise, as the mirror reflective element is bleached or undimmed, the video mirror display screen may reduce its intensity accordingly.

Desirably, the video mirror display screen emits light that is bright enough to be readily viewable and discernible during high ambient lighting conditions, such as are typically encountered on a sunny day. Preferably, the video mirror display luminance (and especially for a TFT LCD display element showing video or full color video or still images) is greater than about 500 candelas per square meter ($cd/m^2$), more preferably greater than about 1,000 $cd/m^2$, and more preferably greater than about 1,500 $cd/m^2$ as viewed by the driver viewing the transflective mirror reflective element that the video display is disposed behind and is emitting light therethrough. This is to help ensure that the driver can discern any video image being displayed against the sunlight streaming in through the rear window and incident at the display screen at the interior mirror assembly that will tend to wash-out the video image unless the video image is sufficiently bright. Optionally, the display screen may utilize aspects of the display element described in U.S. Pat. No. 7,855,755, which is hereby incorporated herein by reference in its entirety.

Optionally, the present invention may provide a decoder that includes a microprocessor built into the package and with "OSD" (On Screen Display) capability. Thus, the control circuitry may be moved into the decoder and thus combine the display module circuit element or PCB decoder electronics with the mirror circuit element or PCB electronics (such as by utilizing aspects of the vision systems described in PCT Application No. PCT/US10/47256, filed Aug. 31, 2010, published on Mar. 10, 2011 as international publication No. WO 2011/028686, which is hereby incorporated herein by reference in its entirety). Such combined circuitry can eliminate the need for an additional processor on the mirror PCB and may combine all feature controls into the decoder. This saves system cost, improves EMC, reduces the PCB size and gives enhanced or full control of the video mirror system to one processor.

Optionally, such a combined circuitry decoder may include additional enhancement to the existing decoder chip so that the decoder may also control the dimming of a variable reflectivity reflective element or electro-optic or electrochromic reflective element. This would eliminate the mirror EC PCB assembly and would combine all the mirror electronics on a single or common circuit element or PCB that would have the decoder control all the video and reflective element dimming features. For example, a decoder, such as a Techwell 8817 decoder available from Techwell Inc. of San Jose, Calif., or other suitable decoder, may be disposed at a video display screen and may receive standard video signals, such as NTSC signals or PAL signals or the like, from one or more cameras of the vehicle. The decoder may decode the NTSC signals and may digitize the signals and send the digital signal to the display screen or LCD TFT screen. The decoder provides on screen display (OSD) capabilities and may provide other signals or messages with the video feed to the video screen.

Optionally, such a decoder (such as a Techwell 8817 Decoder or the like) may be implemented with a video screen for a prismatic video mirror application, and may have a microprocessor and/or other data processing resources, such as memory, converters (such as A/D converters and/or the like), and/or CAN/LIN controllers and/or the like, incorporated into the same integrated circuit chip or package and may include OSD capability too.

Thus, the decoder may decode the video signal and may provide OSD capability and EC control capability, and may receive inputs from sensors (such as imaging sensors or photosensors or the like), and may receive switch inputs and may control various accessories in response to the user inputs or switch inputs. The decoder may share or access photo sensors to control the dimming of the display. The decoder thus provides a highly integrated TFT flat panel display controller at a reduced cost, and integrates a microprocessor in the single circuit element or board or chip. The decoder may provide UART capability, $I^2C$ capability, SPI capability and/or the like. Optionally, the decoder may include a transceiver or the like and the decoder may connect to or link to a LIN node of a network system of the vehicle.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 7,626,749; 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, and/or PCT Application No. PCT/US2010/029173, filed Mar. 30, 2010 and published Oct. 7, 2010 as International Publication No. WO 2010/114825, and/or PCT Application No. PCT/US10/32017, filed Apr. 22, 2010 and published Oct. 28, 2010 as International Publication No. WO 2010/124064, and/or PCT Application No. PCT/US10/51741, filed Oct. 7, 2010, published Apr. 14, 2011 as international publication No. WO 2011/044312, and/or Ser. No. 13/020,110, filed Feb. 3, 2011, which are hereby incorporated herein by reference in their entireties, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein in their entireties; and/or as described in U.S. Pat. No. 7,195,381, which is hereby incorporated herein by reference in its entirety. Optionally, the electrochromic circuitry and/or a glare sensor (such as a rearward facing glare sensor that receives light from rearward of the mirror assembly and vehicle through a port or opening along the casing and/or bezel portion and/or reflective element of the mirror assembly) and circuitry and/or an ambient light sensor and circuitry may be provided on one or more circuit boards of the mirror assembly. The mirror assembly may include one or more other displays, such as the types disclosed in U.S. Pat. Nos. 5,530,240 and/or 6,329,925, which are hereby incorporated herein by reference in their entireties, and/or display-on-demand transflective type displays, such as the types disclosed in U.S. Pat. Nos. 7,370,983; 7,274,501; 7,255,451; 7,195, 381; 7,184,190; 5,668,663; 5,724,187 and/or 6,690,268, and/ or in U.S. patent application Ser. No. 11/226,628, filed Sep. 14, 2005, published Mar. 23, 2006 as U.S. Publication No. 2006/0061008, now abandoned; and/or Ser. No. 10/538,724, filed Jun. 13, 2005 and published Mar. 9, 2006 as U.S. Publication No. US-2006-0050018, and/or PCT Application No. PCT/US03/29776, filed Sep. 9, 2003 and published Apr. 1, 2004 as International Publication No. WO 2004/026633, which are all hereby incorporated herein by reference in their entireties. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854; 6,420,036; and/or 7,274,501, and in PCT Application No. PCT/US03/29776, filed Sep. 9, 2003 and published Apr. 1, 2004 as International Publication No. WO 2004/026633, which are all hereby incorporated herein by reference in their entireties.

Optionally, the interior rearview mirror assembly may comprise a prismatic mirror assembly or a non-electro-optic mirror assembly or an electro-optic or electrochromic mirror assembly. For example, the interior rearview mirror assembly may comprise a prismatic mirror assembly, such as the types described in U.S. Pat. Nos. 7,249,860; 6,318,870; 6,598,980; 5,327,288; 4,948,242; 4,826,289; 4,436,371; and 4,435,042; and PCT Application No. PCT/US2004/015424, filed May 18, 2004 and published on Dec. 2, 2004, as International Publication No. WO 2004/103772, which are hereby incorporated herein by reference in their entireties. Optionally, the prismatic reflective element may comprise a conventional prismatic reflective element or prism or may comprise a prismatic reflective element of the types described in U.S. Pat. Nos. 7,420,756; 7,274,501; 7,249,860; 7,338,177; and/or 7,255,451, and/or PCT Application No. PCT/US03/29776, filed Sep. 19, 2003 and published Apr. 1, 2004 as International Publication No. WO 2004/026633; and/or PCT Application No. PCT/US2004/015424, filed May 18, 2004 and published on Dec. 2, 2004, as International Publication No. WO 2004/103772, which are all hereby incorporated herein by reference in their entireties, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

Optionally, the multi-pixel TFT reconfigurable video display screen and/or mirror may include user interface inputs, such as buttons or switches or touch or proximity sensors or the like, with which a user may adjust one or more characteristics of the imaging sensor and/or imaging system, such as via the principles described in U.S. Pat. Nos. 7,881,496 and/or 7,855,755, and/or U.S. provisional application Ser. No. 60/618,686, filed Oct. 14, 2004, which are hereby incorporated herein by reference in their entireties. Optionally, the images captured by the imaging sensor or camera may be processed by the control to extract information or data for different applications or systems, such as described in U.S. Pat. No. 7,881,496, and/or U.S. provisional application, Ser. No. 60/618,686, filed Oct. 14, 2004, which are hereby incorporated herein by reference in their entireties.

The control of the mirror assembly and/or the display subsystem or display screen may receive image data or the like from an imaging sensor or camera positioned elsewhere at or on or in the vehicle, such as at a forward or sideward portion of the vehicle with a forward or sideward exterior field of view, or such as at an interior portion (such as at or near or associated with the interior rearview mirror assembly or an accessory module or windshield electronics module or the like) of the vehicle with an interior field of view (such as into the vehicle cabin) or an exterior field of view (such as forwardly of and through the windshield of the vehicle). The signal from the camera or image data may be communicated to the control via wireless communication, such as IR signals or VHF or UHF signals or the like, or via a multiplex bus system of the vehicle or the like. For example, the connection or link between the imaging sensor or controls and the mirror assembly and/or display screen module may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA), or via wireless communications such as VHF or UHF or RF signals, and/or the like, depending on the particular application of the mirror/display system and the vehicle.

The imaging sensor or camera may provide various image data signals, such as an NTSC signal or LVDS, PAL, analog RGB, component video, SECAM, S-video or the like. Optionally, the imaging system may be operable to selectively switch between, for example, PAL and NTSC, to adjust the imaging system and mirror/display system to accommodate European and U.S. applications.

The interior rearview mirror assembly may include a bezel portion and casing, such as described above, or the mirror assembly may comprise other types of casings or bezel portions or the like, such as described in U.S. Pat. Nos. 7,338,177; 7,249,860; 6,439,755; 4,826,289; and 6,501,387; and/or PCT Application No. PCT/US2004/015424, filed May 18, 2004 and published on Dec. 2, 2004, as International Publication No. WO 2004/103772, which are all hereby incorporated herein by reference in their entireties, without affecting the scope of the present invention. For example, the mirror assembly may comprise a flush or frameless or bezelless reflective element, such as the types described in U.S. Pat. Nos. 7,626,749; 7,370,983; 7,360,932; 7,255,451; 7,274,501; and/or 7,184,190, and/or in U.S. patent application Ser. No. 11/226,628, filed Sep. 14, 2005, published Mar. 23, 2006 as U.S. Publication No. 2006/0061008, now abandoned; and/or Ser. No. 10/538,724, filed Jun. 13, 2005 and published Mar. 9, 2006 as U.S. Publication No. US-2006-0050018, and/or in PCT Application No. PCT/US2004/015424, filed May 18, 2004 and published on Dec. 2, 2004, as International Publication No. WO 2004/103772; PCT Application No. PCT/US03/35381, filed Nov. 5, 2003 and published May 21, 2004 as International Publication No. WO 2004/042457, and/or PCT Application No. PCT/US10/32017, filed Apr. 22, 2010 and published Oct. 28, 2010 as International Publication No. WO 2010/124064, and/or PCT Application No. PCT/US10/51741, filed Oct. 7, 2010, published Apr. 14, 2011 as international publication No. WO 2011/044312, which are all hereby incorporated herein by reference in their entireties.

Optionally, the mirror assembly may comprise a modular mirror construction, and may include back housing portions or the like, such as cap portions of the types described in PCT Application No. PCT/US2004/015424, filed May 18, 2004 and published on Dec. 2, 2004, as International Publication No. WO 2004/103772, which is hereby incorporated herein by reference in its entirety. The display screen may be provided as a modular display screen and may be mountable or installable in the appropriate or suitable mirror casing to provide a modular minor assembly and display screen. For example, a rear casing or cap portion may include the display screen module including the associated components, such as the rails and motor and the like, and may be attachable to a reflective element and/or bezel portion to assemble the modular mirror assembly. The display screen module thus may be provided as an optional component or accessory for a vehicle, and may be readily assembled to a common reflective element and/or bezel portion of the mirror assembly.

Optionally, the minor casing and/or reflective element, and/or the display screen casing and/or display screen may include customized or personalized viewable characteristics, such as color or symbols or indicia selected by the vehicle manufacturer or owner of the vehicle, such as the customization characteristics described in U.S. Pat. Nos. 7,626,749 and/or 7,255,451, and/or PCT Application No. PCT/US2004/015424, filed May 18, 2004 and published on Dec. 2, 2004, as International Publication No. WO 2004/103772; and/or U.S. patent application Ser. No. 11/243,783, filed Oct. 5, 2005 and published Apr. 20, 2006 as U.S. Publication No. US 2006-0082192, which are hereby incorporated herein by reference in their entireties. For example, the frame or casing of the display module and/or the mirror assembly may be selected to have a desired color or combination of colors (or text or print or indicia thereon) to personalize the appearance of the mirror assembly. Optionally, the reflective element may include text or symbols or icons or other characters or indicia to provide a desired appearance or message at the mirror assembly or display screen, such as by utilizing aspects of the mirror assembly described in PCT Application No. PCT/US2004/015424, filed May 18, 2004 and published on Dec. 2, 2004, as International Publication No. WO 2004/103772, and/or U.S. Pat. No. 7,626,749, and/or U.S. patent application Ser. No. 11/243,783, filed Oct. 5, 2005 and published Apr. 20, 2006 as U.S. Publication No. US 2006-0082192, which are hereby incorporated herein by reference in their entireties. The icons or characters or indicia may be formed at or near or on the display screen, or may be provided via graphic overlays when the display screen is extended and operating, or may otherwise be formed or provided at or on or in the display screen casing or frame, without affecting the scope of the present invention. Optionally, the bezel or frame color or colors may be selected to be designer colors or may match or contrast the color of the mirror casing, and/or may have logos or icons or other indicia thereon. Optionally, the display screen module may include warnings or other statements or alerts or messages printed or otherwise formed on the bezel or frame portion of the display screen so that the messages or the like are readily viewable when the display screen is extended.

Optionally, the mirror assembly and/or prismatic or electrochromic reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference in their entireties, and/or may be display-on-demand or transflective type displays, such as the types disclosed in U.S. Pat. Nos. 7,855,755; 7,581,859; 7,338,177; 7,195,381; 6,690,298; 5,668,663 and/or 5,724,187, and/or in U.S. patent application Ser. No. 11/226,628, filed Sep. 14, 2005, published Mar. 23, 2006 as U.S. Publication No. 2006/0061008, now abandoned; and/or Ser. No. 13/020,110, filed Feb. 3, 2011, and/or in PCT Application No. PCT/US03/29776, filed Sep. 19, 2003 and published Apr. 1, 2004 as International Publication No. WO 2004/026633, which are all hereby incorporated herein by reference in their entireties. Optionally, a prismatic reflective element may comprise a display on demand or transflective prismatic element (such as described in PCT Application No. PCT/US03/29776, filed Sep. 19, 2003 and published Apr. 1, 2004 as International Publication No. WO 2004/026633; and/or U.S. Pat. No. 7,338,177, which are all hereby incorporated herein by reference in their entireties) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,877,888; 6,824,281; 6,690,268; 6,672,744; 6,386,742; and 6,124,886, and/or, and/or PCT Application No. PCT/US03/03012, filed Jan. 31, 2003 and published Aug. 7, 2003 as International Publication No. WO 03/065084, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published on Dec. 2, 2004 as International Publication No. WO 2004/103772, which are hereby incorporated herein by reference in their entireties.

Optionally, the user inputs of the mirror assembly or display or module may comprise other types of buttons or switches for controlling or activating/deactivating one or more electrical accessories or devices of or associated with the mirror assembly. The mirror assembly may comprise any type of switches or buttons, such as touch or proximity sensing switches, such as touch or proximity switches of the types described above, or the inputs may comprise other types of buttons or switches, such as those described in U.S. Pat. Nos. 7,523,403 and/or 7,253,723, which are hereby incorporated herein by reference in their entireties, or such as fabric-made position detectors, such as those described in U.S. Pat. Nos. 6,504,531; 6,501,465; 6,492,980; 6,452,479; 6,437,258; and 6,369,804, which are hereby incorporated herein by reference in their entireties. For example, the inputs may comprise a touch or proximity sensor of the types commercially available from TouchSensor Technologies, LLC of Wheaton, Ill. The touch or proximity sensor may be operable to generate an electric field and to detect the presence of a conductive mass entering the field. When a voltage is applied to the sensor, the sensor generates the electric field, which emanates through any dielectric material, such as plastic or the like, at the sensor. When a conductive mass (such as a person's finger or the like, or metal or the like) enters the electric field, the sensor may detect a change in the field and may indicate such a detection. Other types of switches or buttons or inputs or sensors may be incorporated to provide the desired function, without affecting the scope of the present invention.

Optionally, the user inputs or buttons may comprise user inputs for a garage door opening system, such as a vehicle based garage door opening system of the types described in U.S. Pat. Nos. 6,396,408; 6,362,771; 7,023,322; and 5,798, 688, which are hereby incorporated herein by reference in their entireties. The user inputs may also or otherwise function to activate and deactivate a display or function or accessory, and/or may activate/deactivate and/or commence a calibration of a compass system of the mirror assembly and/or vehicle. The compass system may include compass sensors and circuitry within the mirror assembly or within a compass pod or module at or near or associated with the mirror assembly. Optionally, the user inputs may also or otherwise comprise user inputs for a telematics system of the vehicle, such as, for example, an ONSTAR® system as found in General Motors vehicles and/or such as described in U.S. Pat. Nos. 4,862,594; 4,937,945; 5,131,154; 5,255,442; 5,632,092; 5,798,688; 5,971,552; 5,924,212; 6,243,003; 6,278,377; and 6,420,975; 6,477,464; 6,946,978; 7,308,341; 7,167,796; 7,004,593; and/or 6,678,614, and/or PCT Application No. PCT/US03/40611, filed Dec. 19, 2003 and published Jul. 15, 2004 as International Publication No. WO 2004/058540, and/or PCT Application No. PCT/US03/308877, filed Oct. 1, 2003 and published Apr. 15, 2004 as International Publication No. WO 2004/032568, which are all hereby incorporated herein by reference in their entireties.

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775; and/or 7,249,860, microphones, such as disclosed in U.S. Pat. Nos. 7,657,052; 6,243,003; 6,278,377; and/or 6,420,975, and/or PCT Application No. PCT/US03/30877, filed Oct. 1, 2003, and published Apr. 15, 2004 as International Publication No. WO 2004/032568, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,881,496; 7,526,103; 7,400,435; 6,690,268 and 6,847,487; and/or U.S. provisional application Ser. No. 60/618,686, filed Oct. 14, 2004, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205; and/or 7,423,522, and/or an ONSTAR® system, a compass, such as disclosed in U.S. Pat. Nos. 5,924,212; 4,862,594; 4,937,945; 5,131,154; 5,255,442; and/or 5,632,092, an alert system and/or components or elements thereof (such as described in PCT Application No. PCT/US2010/25545, filed Feb. 26, 2010 and published on Sep. 2, 2010 as International Publication No. WO 2010/099416, which is hereby incorporated herein by reference in its entirety), and/or any other accessory or circuitry or the like (with all of the above-referenced patents and PCT and U.S. patent applications being commonly assigned to Donnelly Corporation, and with the disclosures of the referenced patents and patent applications being hereby incorporated herein by reference in their entireties).

Optionally, the accessory or accessories, such as those described above and/or below, may be positioned at or within the mirror casing and may be included on or integrated in a printed circuit board positioned within the mirror casing, such as along a rear surface of the reflective element or elsewhere within a cavity defined by the casing, without affecting the scope of the present invention. The user actuatable inputs and/or touch sensors and/or proximity sensors and displays described above may be actuatable to control and/or adjust the accessories of the mirror assembly/system and/or overhead console and/or accessory module and/or vehicle. The connection or link between the controls and the display screen device and/or the navigation system and/or other systems and accessories of the mirror system may be provided via vehicle electronic or communication systems and the like, and may be connected via various protocols or nodes, such as BLUETOOTH®, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, or via VHF or UHF or other wireless transmission formats, depending on the particular application of the mirror/accessory system and the vehicle. Optionally, the connections or links may be provided via various wireless connectivity or links, without affecting the scope of the present invention.

Changes and modifications in the specifically described embodiments may be carried out without departing from the principles of the present invention, which is intended to be limited only by the scope of the appended claims as interpreted according to the principles of patent law.

The invention claimed is:

1. A vehicular vision system for a vehicle, said vehicular vision system comprising:

a camera subsystem, said camera subsystem comprising an imaging sensor disposed at a vehicle equipped with said vehicular vision system, said imaging sensor capturing image data and said camera subsystem wirelessly transmitting said image data;

a display subsystem comprising a video display screen disposed in the equipped vehicle for displaying images for viewing by a driver of the equipped vehicle when the driver is normally operating the equipped vehicle, wherein said display subsystem is operable to receive said transmitted image data from said camera subsystem;

wherein said display subsystem transmits an error signal responsive to processing of said image data and wherein said camera subsystem receives said error signal and (a) adjusts a compression factor of said image data responsive to said error signal and (b) adjusts a transmission rate of said image data responsive to said error signal;

wherein, when said error signal is indicative of an increase in errors in the transmission of image data, said camera subsystem decreases said transmission rate and increases said compression factor, and wherein, when said error signal is indicative of a decrease in errors in the transmission of image data, said camera subsystem increases said transmission rate and decreases said compression factor;

wherein said display subsystem determines a number of errors in the image data received by said display subsystem and wherein said display subsystem reports the number of errors in the received image data to said camera subsystem via a return path of a wireless communication link between said display subsystem and said camera subsystem; and wherein, responsive to said display subsystem determining an increase in errors in said image data to at least a threshold number of errors, said camera subsystem reduces portions of the video image data before compression.

2. The vehicular vision system of claim 1, wherein said vehicular vision system comprises an aftermarket vision system, and wherein said camera subsystem is electrically connected to a power source of the equipped vehicle and wherein said display subsystem is electrically connected to a power source of the equipped vehicle.

3. The vehicular vision system of claim 1, wherein said imaging sensor has an exterior field of view of an area exterior of the equipped vehicle.

4. The vehicular vision system of claim 3, wherein said imaging sensor has a rearward field of view relative to a direction of travel of the equipped vehicle.

5. The vehicular vision system of claim 4, wherein said imaging sensor is operable to capture rearward images to assist the driver of the equipped vehicle during a reversing maneuver of the equipped vehicle.

6. The vehicular vision system of claim 1, wherein said camera subsystem comprises a decoder that converts a composite video signal from said imaging sensor to digital image data.

7. The vehicular vision system of claim 1, wherein said camera subsystem compresses said image data and transmits compressed image data.

8. The vehicular vision system of claim 7, wherein said display subsystem decompresses compressed image data.

9. The vehicular vision system of claim 8, wherein said display subsystem encodes said decompressed image data for display by said video display screen.

10. The vehicular vision system of claim 1, wherein said camera subsystem, responsive to said error signal, adjusts a bandwidth required to wirelessly transmit said image data.

11. The vehicular vision system of claim 1, wherein said camera subsystem, responsive to a determination that the increase in errors in said image data is at least to the threshold number of errors, at least one of (a) reduces or eliminates color information, (b) reduces image resolution and (c) reduces an image capture frame rate.

12. A vehicular vision system for a vehicle, said vehicular vision system comprising:

a camera subsystem, said camera subsystem comprising an imaging sensor disposed at a vehicle equipped with said vehicular vision system and having a rearward field of view rearward of the equipped vehicle, said imaging sensor capturing image data and said camera subsystem wirelessly transmitting said image data;

a display subsystem comprising a video display screen disposed in an interior rearview mirror assembly of the equipped vehicle for displaying images for viewing by a driver of the equipped vehicle through a transflective reflector of a transflective reflective element of said interior rearview mirror assembly when the driver is normally operating the equipped vehicle, wherein said display subsystem is operable to receive said transmitted image data from said camera subsystem;

wherein said display subsystem transmits an error signal responsive to processing of said image data and wherein said camera subsystem receives said error signal and (a) adjusts a compression factor of said image data responsive to said error signal and (b) adjusts a transmission rate of said image data responsive to said error signal;

wherein, when said error signal is indicative of an increase in errors in the transmission of image data, said camera subsystem decreases said transmission rate and increases said compression factor, and wherein, when said error signal is indicative of a decrease in errors in the transmission of image data, said camera subsystem increases said transmission rate and decreases said compression factor;

wherein said display subsystem determines a number of errors in the image data received by said display subsystem and wherein said display subsystem reports the number of errors in the received image data to said camera subsystem via a return path of a wireless communication link between said display subsystem and said camera subsystem; and wherein, responsive to said display subsystem determining an increase in errors in said image data to at least a threshold number of errors, said camera subsystem reduces portions of the video image data before compression.

13. The vehicular vision system of claim 12, wherein said camera subsystem, responsive to said error signal, adjusts a bandwidth required to wirelessly transmit said image data.

14. A vehicular vision system for a vehicle, said vehicular vision system comprising:

a camera subsystem, said camera subsystem comprising an imaging sensor disposed at a vehicle equipped with said vehicular vision system and having a field of view exterior of the vehicle, said imaging sensor capturing image data and said camera subsystem wirelessly transmitting said image data;

a display subsystem comprising a video display screen disposed in the equipped vehicle for displaying images for viewing by a driver of the equipped vehicle when the driver is normally operating the equipped vehicle, wherein said display subsystem is operable to receive said transmitted image data from said camera subsystem;

wherein said display subsystem transmits an error signal responsive to processing of said image data and wherein said camera subsystem receives said error signal and (a) adjusts a compression factor of said image data responsive to said error signal and (b) adjusts a transmission rate of said image data responsive to said error signal;

wherein, when said error signal is indicative of an increase in errors in the transmission of image data, said camera subsystem decreases said transmission rate and increases said compression factor, and wherein, when said error signal is indicative of a decrease in errors in the transmission of image data, said camera subsystem increases said transmission rate and decreases said compression factor;

wherein said display subsystem determines a number of errors in the image data received by said display subsystem and wherein said display subsystem reports the number of errors in the received image data to said camera subsystem via a return path of a wireless communication link between said display subsystem and said camera subsystem, wherein, responsive to said display subsystem determining an increase in errors in said image data to at least a threshold number of errors, said camera subsystem reduces portions of the video image data before compression; and wherein said camera subsystem, responsive to a determination that the increase in errors in said image data is at least to the threshold number of errors, at least one of (a) reduces or eliminates color information, (b) reduces image resolution and (c) reduces an image capture frame rate.

15. The vehicular vision system of claim 14, wherein said camera subsystem, responsive to said error signal, adjusts a bandwidth required to wirelessly transmit said image data.

* * * * *

UNITED STATES PATENT AND TRADEMARK OFFICE
CERTIFICATE OF CORRECTION

| | |
|---|---|
| PATENT NO. | : 8,890,955 B2 |
| APPLICATION NO. | : 13/023750 |
| DATED | : November 18, 2014 |
| INVENTOR(S) | : Kenneth C. Peterson |

It is certified that error appears in the above-identified patent and that said Letters Patent is hereby corrected as shown below:

In the specification

Column 16
Line 66, "minor" should be --mirror--

Column 17
Line 4, "minor" should be --mirror--
Line 8, "minor" should be --mirror--

Signed and Sealed this
Twenty-eighth Day of June, 2016

Michelle K. Lee
*Director of the United States Patent and Trademark Office*